(12) United States Patent
Van Den Bergh et al.

(10) Patent No.: US 9,672,229 B2
(45) Date of Patent: Jun. 6, 2017

(54) DATA SELECTION FOR TRANSPORT SECTOR

(75) Inventors: Kris Van Den Bergh, Belgian (BE); Patrick Van Dessel, Belgian (BE); Wim Cyriel Maria De Munck, Belgian (BE); Tom Hugo Jan Luc De Winne, Belgian (BE)

(73) Assignee: AVIOVISION, Genk (BE)

( * ) Notice: Subject to any disclaimer, the term of this patent is extended or adjusted under 35 U.S.C. 154(b) by 836 days.

(21) Appl. No.: 14/117,663

(22) PCT Filed: May 21, 2012

(86) PCT No.: PCT/BE2012/000026
§ 371 (c)(1),
(2), (4) Date: Feb. 19, 2014

(87) PCT Pub. No.: WO2012/155218
PCT Pub. Date: Nov. 22, 2012

(65) Prior Publication Data
US 2015/0149511 A1 May 28, 2015

Related U.S. Application Data

(60) Provisional application No. 61/614,041, filed on Mar. 22, 2012.

(30) Foreign Application Priority Data

May 17, 2011 (BE) .................................. 2011/0298

(51) Int. Cl.
*G01C 21/00* (2006.01)
*G06F 17/30* (2006.01)
(Continued)

(52) U.S. Cl.
CPC ....... *G06F 17/30289* (2013.01); *G06Q 10/10* (2013.01); *G06Q 50/30* (2013.01)

(58) Field of Classification Search
CPC combination set(s) only.
See application file for complete search history.

(56) References Cited

U.S. PATENT DOCUMENTS 5,883,586 A 3/1999 Tran et al.
7,545,274 B2 * 6/2009 Coop .................... G06Q 10/06
340/524

(Continued)

FOREIGN PATENT DOCUMENTS

EP 2144206 1/2010

OTHER PUBLICATIONS

Australian Government—Australian Transport Safety Bureau; "Take-off performance calculation and entry errors: A global perspective" ATSB Transport Safety Investigation Report, Aviation Research and Analysis Report, AR-2009-052. Jan. 2011.

*Primary Examiner* — Hussein A. Elchanti
(74) *Attorney, Agent, or Firm* — Jerold I. Schneider; Schneider Rothman Intellectual Property Law Group, PLLC (57) ABSTRACT

A selection of relevant data from a plurality of transport activity related data to an interface of a predetermined user, located at a location and at a moment in time, wherein the selection occurs on the basis of four parameters being a vehicle identification parameter, a user-related qualification, a location and a time.

21 Claims, 3 Drawing Sheets

(51) Int. Cl.
*G06Q 10/10* (2012.01)
*G06Q 50/30* (2012.01)

(56) References Cited

U.S. PATENT DOCUMENTS

| | | | |
|---|---|---|---|
| 7,769,501 B2 | 8/2010 | Lusardi et al. | |
| 8,321,083 B2* | 11/2012 | Beebe | G06F 11/0739 |
| | | | 701/120 |
| 8,897,949 B1* | 11/2014 | Coop | G07C 5/006 |
| | | | 701/29.1 |
| 8,897,951 B1* | 11/2014 | Knox | B64F 5/0081 |
| | | | 701/29.1 |
| 8,989,951 B1* | 3/2015 | Coop | G01C 23/005 |
| | | | 701/29.1 |
| 2003/0109973 A1 | 6/2003 | Hensey et al. | |
| 2004/0039502 A1* | 2/2004 | Wilson | G01D 9/005 |
| | | | 701/32.7 |
| 2004/0218618 A1 | 11/2004 | Asami | |
| 2006/0248182 A1* | 11/2006 | Glassco | H04L 67/322 |
| | | | 709/223 |
| 2007/0114280 A1* | 5/2007 | Coop | G06Q 50/30 |
| | | | 235/385 |
| 2008/0092244 A1 | 4/2008 | Lee | |
| 2011/0102192 A1 | 5/2011 | Batsakes et al. | |
| 2011/0298638 A1* | 12/2011 | Groeneweg | G08G 1/096775 |
| | | | 340/905 |
| 2012/0150380 A1* | 6/2012 | Whittaker | G07C 5/006 |
| | | | 701/29.4 |

\* cited by examiner

DATA SELECTION FOR TRANSPORT SECTOR

CROSS-REFERENCE TO RELATED APPLICATIONS

This application is the entry into the United States of PCT Application No. PCT/BE2012/000026 filed May 21, 2012 and claims priority from Belgian Patent Application No. BE2011/0298 filed May 17, 2011 and U.S. Provisional Patent Application No. 61/614,041 filed Mar. 22, 2012, the entirety of each of which are hereby incorporated by reference.

TECHNICAL FIELD

The invention relates to a method for selecting relevant information from a database for a user active in the transport sector. In particular, the invention finds its use in the aviation sector, more in particular, the invention relates to the selection of information which, for a pilot, where the latter is performing a task, is relevant at that moment.

STATE OF THE ART

In the transport sector, in particular the aviation sector, obtaining accurate data such as weather information, vehicle information, or environmental information, is crucial for being able to correctly perform a task. This applies to for example operators of the vehicle, who take a vehicle from point A to point B, as well as to the logisticians, who create plannings, as well as to maintenance personnel, who maintain vehicles.

The data relevant for, for example, a pilot to perform his task, relate i.a. to various issues such as weather, flight planning, navigation charts, vehicle operation, vehicle load and the like. Each of these data is updated with a frequency depending on the type of information. Hence, weather information is updated very frequently, for example every fifteen minutes, while information on the operation of the vehicle is updated less frequently, for example every three months. Furthermore, different data are often obtained from different sources. For example, an airline will have a contract with a first company for the supply and renewal of its navigation chart data, and with a second company for the supply and renewal of weather information, and so on. Vehicle operation information is typically present in manuals which, today often in book form, are provided by the vehicle constructor, and which are located in the vehicle. Until now, when the pilot begins his task, a manual selection is made of those data which are relevant for the pilot for his particular task, and the selected data is often traditionally delivered to the pilot, on paper. By this manual and traditional method of working, and the execution protocols that have been developed, one tries to ensure that the correct information arrives at the person with the correct qualification, the pilot.

The disadvantage of this method is that it is very labour intensive. Furthermore, the data on paper do not have an unlimited validity. Updating this information is cumbersome, time consuming and in some cases technically and/or practically impossible.

DESCRIPTION OF THE INVENTION

It is a goal of the present invention to provide a method by which it can be guaranteed that the user always has updated and relevant data.

This goal is achieved by means of the method according to the first claim.

For reasons of clarity, in the description hereafter, the problem definition, the invention with its effects and the advantages will be exemplified for a pilot. However, it will be understood that the invention is applicable in an analogous manner to train conductors, logisticians, maintenance personnel, and further persons active in a transport sector.

The method and the system according to the invention are applicable by means of portable interfaces, such as for example those on mobile terminals, such as tablet computers, smart phones, laptops, etc., or by means of wired interfaces that are provided in the vehicle in a suitable position, such as for example a touch screen in the cockpit of an aircraft.

In a first aspect, the invention relates to a method for supplying relevant data, selected from a set of data related to transport activities in a database, to an interface of a predetermined user, for example a portable interface, or an interface that is provided in the vehicle, comprising the steps described in claim 1.

In the method according to the invention, very specific parameters are attributed to the data which form the basis for further selection. Because the user is being identified, it can be ensured that information is provided to the correct person. As a result of establishing the four selection criteria, relevant information is selected only for the user (via the qualification criterion), and for the task that the user is performing at that moment (via the vehicle identification means), at the location where the task is being performed (via the location criterion), and at the time the task is executed (via the time criterion). In this way, the amount of information that must be delivered to the interface can be considerably limited, which has advantages in terms of communication speed, usage of storage space, energy usage, etc. By applying these criteria, data with a diverse content and use can be correctly and efficiently selected. Because the data can be selected in an automated manner via the portable interface, or an interface provided in the vehicle, and because the selection criteria include a time factor, updating the data is easy. This helps to guarantee that the user is always provided with updated data, and to keep track on the server of which user is provided with updated data and which user is not. The selected data can then be consulted and used by the user. The selection method according to the invention has as an additional advantage that, when a new type of data should be delivered to the users, this can be done by simply adding these new data to the database and attributing parameters, after which the selecting of data will automatically include relevant data of this new type.

Preferably, further a set of functions is available in said interface, with which functions data can be modified by said interface, wherein the method comprises:

attributing to each function at least one parameter which specifies a role, which role is user-related;

obtaining at least one role attributed to the identified user via said interface;

making available only those functions to the identified user to which a role is attributed which is equal to a role attributed to the identified user.

The availability, and thus also the use, of functions to modify data, is controlled via the role attributed to the user of the interface. With this, a control of data modification, independent of the selection and presentation of data, is possible.

Preferably, for said attributing at least 4 parameters to each of the data in said database, the method comprises the steps of:

loading a first type of data via a communication link that extends between a first source and said database; and loading a second type of data via a communication link that extends between a second source and said database.

Furthermore, said loading a first type of data preferably occurs periodically with a first frequency and said loading a second type of data preferably occurs periodically with a second frequency which differs from the first frequency.

Periodically loading different types of data from different sources into a database for the step of attributing the 4 selection parameters, makes it possible to have at its disposal at any moment in time the correct, updated data in the database, and thus also to select the correct, updated data via the interface. Furthermore, attributing the selection parameters to the loaded data will minimize the effort necessary to make the final selection of data, namely, where according to the state of the art the different sources for each section must be checked manually, according to the invention, a set of selection parameters will have to be attributed to each of the data only once, after which the selection can be carried out automatically.

Preferably, selecting data via said interface occurs periodically, wherein for each selection at least the location and the moment in time is updated. This allows the user to always have the correct information at hand for the location and time where he/she is located.

Preferably, a route plan is created which includes at least one set of points in time associated with respective locations, which outline a route geographically and in time, wherein in said step of selecting data not only those data are selected for which one moment in time and one location are located within the time period and the area, but also those data for which the moments in time with their respective location from the latter set are located within the time period and the area. By the specific choice of selection parameters, it becomes possible for the user to select not only those data which are relevant for him or her at the time, but also the data which are relevant for the planned route. Thus, for a pilot, for example the weather information and navigation data of the destination can be selected, as well as weather information and navigation data of locations between the point of origin and the destination.

Alternatively, also a travel area can be created that includes at least one set of locations where the interface will be located in a predetermined travel period, wherein in said step of selecting data, those data are selected for which the travel area at least partially overlaps with the area of the third parameter, and for which the travel time at least partially overlaps with the area of the fourth parameter. This is for example applicable in the case of helicopter flights, for which the travel route is not strictly fixed and one can, for instance, just as well fly from A to B to C and back to A, as from A to C to B and back to A.

In one embodiment, one or more of the selection criteria can be entered by the user on the interface. In another embodiment, one or more of the selection criteria can be determined, for example searched, in a central control system, on the basis of data provided by the user when registering. In still another embodiment, both can occur, namely entering on the interface and determining on the basis of the registration data. In this embodiment, the entered and determined selection criteria can be compared with each other, which can increase the safety.

Preferably, said selected data are displayed to the user on the interface, for example textually or graphically on a map. This will give the user the possibility to consult the selected and thus relevant data for him or her directly via the interface. It will be clear in this context that not all selected data should be displayed simultaneously to the user via the interface, but that the selected data can be ordered into a menu structure so that the user can navigate through the selected data.

In an embodiment, the above criteria can have an adjustable level of importance, wherein optionally the criteria for which a lower level of importance is set, are ignored when selecting the relevant data.

In a second aspect, combinable with the other aspects described herein, the invention relates to a method wherein an interface, which is used for consulting transport activity related data, provides access via this application to a social network of users, which for example have the same qualification, via which these users can exchange messages, such as warnings and annotations, with each other. This allows the messages/annotations to increase the relevance of the data displayed on the interface. Furthermore, the server can be provided to take into account the messages/annotations of the users when selecting data in order to improve the data selection. These messages themselves can be, but not necessarily, treated in the same manner as described herein to decide to which interfaces or users these messages are transmitted. For example, when a pilot transmits a warning of turbulence, this warning is relevant for all pilots that are or will be in a certain area in a given time period, but the type of aircraft is of less importance.

In a third aspect, the invention relates to a system for the supply of a selection of relevant data, selected from a plurality of transport activity related data, to an interface of a predetermined user, comprising the technical features of the second independent claim. Moreover, the system can be provided with means to carry out all the steps of the method described herein, and all preferred embodiments thereof.

BRIEF DESCRIPTION OF THE DRAWINGS

The invention will now be further described with reference to an exemplary embodiment shown in the drawing.

In the drawing.

In the drawing, a similar or analogous element is attributed the same reference numeral.

EMBODIMENTS OF THE INVENTION

The present invention will hereinafter be described on the basis of specific embodiments and with reference to certain drawings, but the invention is not limited thereto and is only defined by the claims. The drawings shown here are merely schematic representations and are not limiting. In the drawings, the dimensions of some parts can be shown enlarged, which means that the parts in question are therefore not shown to scale, and this for illustrative purposes only. The dimensions and the relative dimensions do not necessarily correspond to the actual practical embodiments of the invention.

Moreover, terms such as "first", "second", "third", and the like are used in the description and in the claims to make a distinction between similar elements and not necessarily to indicate a sequential or chronological order. The terms in question are interchangeable in the appropriate circumstances, and the embodiments of the invention may operate in other sequences than those described or illustrated herein.

Furthermore, terms such as "top", "bottom", "above", "below", and the like are used in the description and in the claims for descriptive purposes and not necessarily to indicate relative positions. The terms used as such are interchangeable in the appropriate circumstances, and the embodiments of the invention may operate in other orientations than those described or illustrated here.

The term "comprising" and derivative terms, as used in the claims, should not be interpreted as being limited to the means mentioned thereafter; the term does not exclude other elements or steps. The term should be interpreted as a specification of the listed properties, integers, steps, or components referred to, nevertheless without excluding the presence or the addition of one or more additional properties, integers, steps or components, or groups thereof. The scope of an expression such as "a device comprising the means A and B" is therefore not only limited to devices consisting merely of components A and B. On the other hand, what is meant is that, with regard to the present invention, the only relevant components are A and B.

Figure 1:
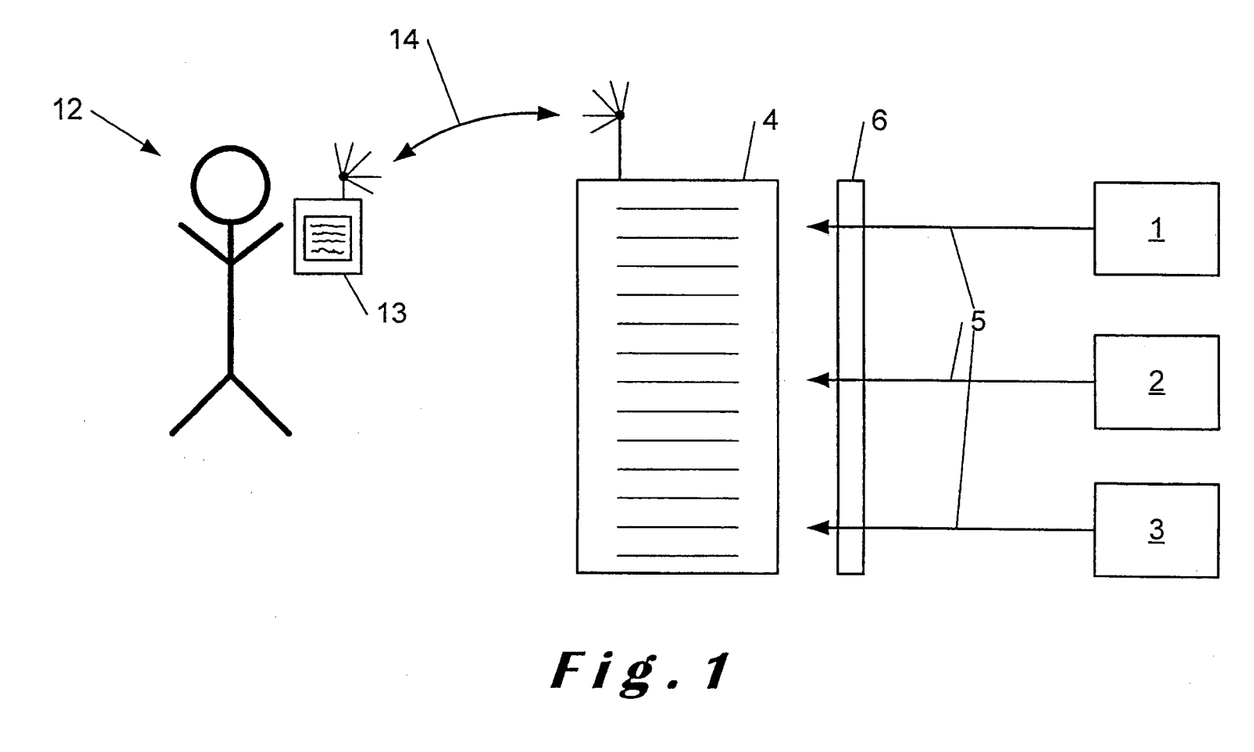
FIG. 1 shows a diagram of how data are processed in the transport sector.

FIG. 1 shows how in the transport sector data are transferred from the source of the data to the user of the data. FIG. 1 shows on the right side three sources of information 1, 2 and 3. Examples of sources are companies providing weather information, companies providing navigational charts, manufacturers of transportation devices which provide manuals and operating procedures, employees who provide transportation devices with cargo, employees who prepare route plannings, companies that provide traffic information and further companies and/or persons delivering information relevant for an employee in the transport sector, in particular a pilot, to perform his task. The figure shows three sources, however, it will be clear that the invention is not limited to a configuration with three sources, but that one or several sources may be present.

Data is transferred from the sources 1, 2 and 3, to a central information storage system 4 with a memory, which in practice will be designed like a server. The transfer of information to the central information storage system, shown in the figures by arrows 5, can be done either via a hardware-based communication link, or via a wireless communication link that is either created directly or via a network such as the internet.

Data coming from the sources 1, 2 and 3 are typically updated at a predetermined frequency. The frequency depends on the type of information and is typically determined by the source, but may for example also depend on the supplier (company) and/or the contract between the customer and the supplier of the data. For example, weather information will have a high update frequency, such as every fifteen minutes, while manuals have a low update frequency, for example every six months. The update frequency will have an influence on the parameter time period, which is attributed to the data and which will be further discussed in detail below.

According to the invention, the data transferred to the central information storage system 4 are provided with at least four selection parameters. Providing these parameters may be done when the data have been recorded in the memory of the central storage system 4, or it may be done before the data are written in the memory. In FIG. 1, block 6 represents the provision of the parameters before the data are recorded in the memory.

Hereafter, the invention is further elucidated on the basis of an example with a portable interface 13. Nevertheless, it is clear that the invention can also be applied with a specific, fixed interface that is provided in the vehicle.

FIG. 1 also shows on the left side a user 12 with a portable interface 13 who has access to the information from the central storage system 4 via a communication link 14. However, because the central storage system 4 contains more information than is relevant for the user 12, a selection is made of data from the central storage system 4. Thus, the central storage system will, for example, contain weather information from all around the world, while for the user only weather information from those locations is relevant where he or she is going while performing his or her task. Also, the central storage system will, for example, contain all the manuals of all types of Airbus aircraft while the user will be performing his task with one specific Airbus aircraft. The only manual that is relevant for the user is that of the latter one specific Airbus aircraft. The selection of relevant data from the central storage system 4 is described further below.

Figure 3:
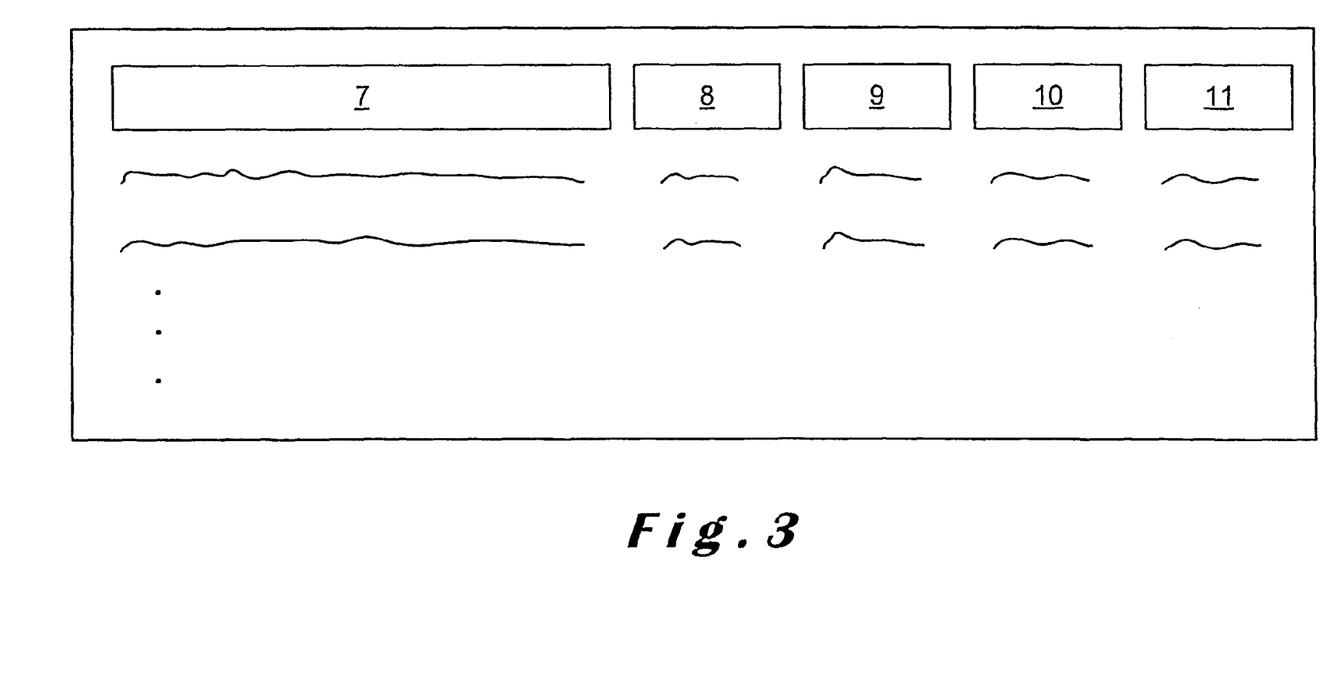
FIG. 3 shows a database according to the invention.

FIG. 3 shows a schematic representation of the database as it will be designed in the memory of the central information storage system 4. In the figure, a database is shown with multiple rows and columns. Each of the data is stored in a separate row in the data field 7. Four selection parameter fields 8, 9, 10, and 11, are coupled to this data field 7, which are provided to contain parameters. The selection parameters are allocated to each of the data to assign validity constraints to the data, as further described in detail.

A first 8 of the four selection parameters contains one or more qualifications. A qualification is a property that belongs to a user and thus indicates the degree of knowledge and/or ability of that user. Thus, a pilot is qualified to fly and to interpret the information that is associated with flying, like weather information. More in detail, a pilot may be qualified to fly an Airbus A320, while the same pilot may not be qualified to fly an Airbus A380. The pilot will therefore not be able to interpret information that relates solely to an Airbus A380. A maintenance employee may be qualified to perform maintenance to a certain type of vehicle, and to interpret the relevant information. The qualification criterion establishes a link between the user and the data in order to ensure that the user can properly work with the data. To each of the data, one or more qualifications are attributed that a user needs to have to be able to correctly use the corresponding data.

A second 9 of the four selection parameters contains one or more vehicle identifier means. A vehicle identifier means is for example a license plate of a car, a serial number of a train, or an aircraft tail number. Using a vehicle identifier means, a vehicle or vehicle type can be identified. One vehicle identifier means will be allocated primarily to data that are vehicle-dependent, such as load capacity, manuals and the like. Information that is not vehicle-dependent, such as weather information, is valid for all vehicle types and will therefore have as second selection parameter 'all', and thus comprise all vehicle identifier means. Some information may for example be valid for all trains, and will have as second selection parameter all train identifier means. The vehicle identifier means can refer to one particular vehicle, or it can refer to a type of vehicle.

A third 10 of the four selection parameters contains a time period within which the information may be regarded as valid. For safety reasons, information that is provided, often has a time period allocated to it, within which the information is valid. Outside this time period, the information is regarded as outdated. Some information will have a short validity period, such as weather information, while other information will have a longer validity period, such as vehicle information. For information that is absolutely valid, the time period will be (theoretically) infinite.

A fourth 11 of the four selection parameters contains an area for which information is relevant. Weather information is an example of information that is valid for a limited area. However, for aircrafts, the takeoff velocity of an aircraft will differ from airport to airport. At a high-altitude airport, takeoff will require other aircraft settings and power than takeoff from an airport at sea level. Certain information will be valid everywhere on earth and therefore the whole earth will be attributed as area for such information.

It will be clear that further parameters can be attributed to information. Also, the sequence of the parameters in the database, as well as the structure of the database, may be changed without changing the core of the invention. The invention is therefore not limited to the specific configuration as described above.

The portable interface 13 includes recording means to be able to record information from a user. Such recording means may be a keyboard, a touch screen, a camera, a scanner, or other means that allow transferring information from the outside to the internal memory in the portable interface 13. Via these means, a user can be registered at the portable interface 13, and thus identify himself to the portable interface. The portable interface is further provided to retrieve one or more qualifications that are associated with said user. The qualifications associated with a user are stored in a user database that is stored in an internal memory of the portable interface or in the central storage system. In order to retrieve the qualifications, the portable interface is provided with a processor that transmits identifier means of the registered user to the user database to receive one or more qualifications in return. These qualifications are stored in an internal memory of the portable interface in order to continue to use it when selecting the data, as described below.

Via the recording means, vehicle identifier means are further provided to the portable interface. These vehicle identifier means will also be stored in the internal memory of the portable interface in order to continue to use them when selecting the data. Via the vehicle identifier means, a user can specify with which vehicle or vehicles he or she will perform his or her task. Thus, a pilot will enter the tail number of the aircraft with which he or she will carry out the flight. The vehicle identifier means can also relate to the type of vehicle with which the user will perform his or her task, for example Airbus A321.

The portable interface further includes a clock that keeps time. In selecting data according to the invention, the moment in time is a selection criterion. Because the portable interface includes a clock, the moment in time may easily be retrieved by the processor of the portable interface, and can be used in the selection.

The portable interface preferably includes position detection means with which the location of the portable interface can be read. In selecting data according to the invention, the location of the portable device is a selection criterion. It will therefore be advantageous if the portable interface includes a means for determining the location, such that the location can be requested and used by the processor of the portable interface. It will be clear that it is not essential that the portable interface includes position detection means, but that the location may also be manually delivered to the processor via the recording means.

The portable interface is provided to select data from the central storage system that are relevant for the user. The relevance for the user has four aspects: the qualification of the user, the vehicle that the user has indicated, the location where the user (and the portable interface) is located, and the moment in time when the relevance is determined. To each of the four aspects a parameter is attributed, and the processor of the portable interface, when used as described above, has access to the four parameters. Such access may take the form of reading-out the parameter from the internal memory of the portable interface, or the retrieval of the parameter at the parameter detection means (for time and location).

Data are selected when the four parameters, which reflect the relevance to the user, match the parameters that are attributed to the data in the database. In particular, a data element is selected when: one of the qualities of the user is equal to one of the qualities stored in the database in parameter field 8, and the vehicle identifier means indicated by the user is equal to one of the vehicle identifier means stored in the database in parameter field 9, and when the moment in time is within the time period stored in the database in parameter field 10, and when the location is within the area stored in the database in parameter field 11. By applying these criteria, information that cannot be correctly interpreted by a user, because the user does not have the necessary qualification, is excluded. Also, by applying these criteria, information which relates to a vehicle other than the vehicle the user works with, is excluded. Furthermore, data are excluded which are no longer valid or not yet valid. Finally, data are excluded which are only relevant for a location different from the one where the user is located. As a result, those data are retained, selected, which are relevant for the user.

The validity of data may also have gradations. For example, weather reports are in particular relevant within a short time period, but still relevant to a lesser extent within a longer time period. In the context of this invention, "valid" means that the data are at least somewhat relevant for the context of the user. Optionally, the degree of relevance may be conveyed with the data.

Furthermore, said criteria may have an adjustable level of importance, wherein the system can also provide the possibility to ignore the criteria for which a lower level of importance is set, in selecting the relevant data, i.e. those criteria of less importance are not involved in the selection.

The selected data may be stored in the internal memory of the portable interface to be accessed and used via the internal memory. However, when a good communication link exists between the portable interface and the database, the selected data can be accessed and used online, wherein only the instantaneously accessed and used segment of the selected data is sent to the portable interface.

According to a preferred embodiment of the invention, a route planning is created for the selection, and in the selection not only the location and time of that moment are used as criteria, but also the locations and times planned in the route planning are used as criteria. A route planning is characterized mainly by attributing a location to each moment in time for a period in time, such that from time t1 to time t2, one can go from location p1 to location p2. A route planning will therefore comprise a set of points in time each associated with a location.

Figure 2:
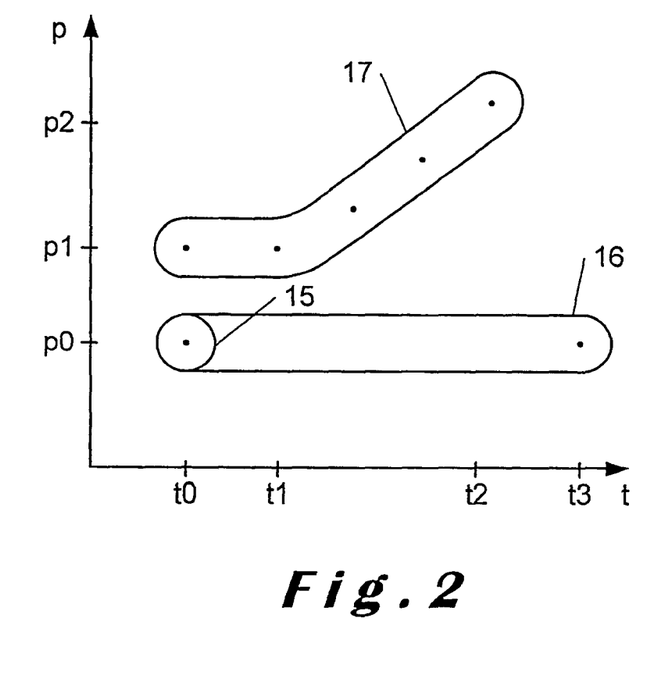
FIG. 2 shows a diagram of the effect of the parameter location and time on the selection of data.

In selecting relevant data, an extension may be made of relevant data by not only considering as relevant those data which are relevant for the location and time of the corresponding moment in time, but also considering as relevant those data which are relevant for a location and time located on the route. The effect of this is illustrated in FIG. 2. FIG. 2 shows a time-location graph, where it is assumed that for each combination of a location and a time, so at any point along the graph, certain information is relevant which is not relevant in a different location and/or time. The information which is valid at this moment (t0) and on this location (p0), is encircled, see reference number 15. When we specify to the portable interface to remain in the same location p0 until time t3, more data will be relevant than only those encircled by circle 15, but the data designated by reference number 16 will be relevant.

A further example is shown in FIG. 2, where a route planning is drawn up to depart at time t1 from location p1 and to arrive at time t2 at location p2. From time t0 to the time of departure t1, the user remains in the same location p1. The selection of data which will be made, is indicated by reference number 17.

It will be understood that the criteria of qualification and of vehicle identifier means, in addition to location and time, also remain selection criteria, despite the fact that these are not shown in FIG. 2. In order to visually represent a selection of all four parameters, four dimensions should need to be displayed. FIG. 2 only shows two dimensions, and is restricted in view, therefore, exclusively to the location and the time criterion, and this to illustrate the effect of a route planning on the data selection.

The portable interface preferably provides the possibility to modify data in the database. In this context, modifying is understood to mean not only changing, but also removing or adding data. For this purpose, functions are provided in the portable interface that may be used by a user to modify the data. In order to prevent a user from modifying data without permission, functions are made available only under certain conditions. To this end, one or more roles a user may have within a company structure are attributed to each function. In addition to qualifications, also one or more roles are attributed to a user which, analogous to qualifications, may be requested by the portable interface after the user has registered. A function is only made available by the portable interface when one of the roles attributed to the function corresponds to one of the roles connected to the registered user.

Because the execution of functions and the retrieval of data depends on several parameters, it is technically possible and simple to create a strict separation between requesting and accessing information on the one hand, and modifying information on the other hand.

FIG. 1 shows how a central storage system contains the database. However, this is only a preferred embodiment. Increased data storage capacity of portable devices will allow the full database to be stored in a portable device that also contains the portable interface. Selecting the data will then occur by the processor of the portable interface on the locally stored database.

The invention is not limited to a method for selecting data where the four selection criteria must be satisfied at the same time, the selection criteria may be applied in steps, as will be explained further in the following example. A setup according to the invention as shown in FIG. 1, allows in a first step to make a selection in the central storage system 4 of the data meeting the criteria qualification and vehicle identifier means, and to transfer this (broad) selection of data to an internal memory of the portable interface. In a further step, the portable interface will make a selection of that information in the internal memory which meets the time and location criterion. In this way, a selection according to the invention is obtained in two steps.

In a preferred embodiment, the system comprises a social network that is accessible via the same interface, preferably from the application for accessing the data. For this purpose, the system possesses a briefing module which groups the volatile information linked to a certain flight. The information may be of the same supplier as the flight plan, and is preferably retrieved as an integrated package via the server. This information on the weather, different operational notifications, weather maps, etc. has until today been displayed textually for the chosen flight. It was the pilot himself who determined the relevance of the data by fully checking it, relating it to each other, and possibly marking it as a bookmark on the summary page.

The information obtained includes many elements that directly or indirectly refer to a location, such as an airport or a waypoint. Objective of the briefing module is to more efficiently offer the available information to the pilot and ease its consolidation, considering the context in which the pilot is, such as:

Flight phase (blocks, taxi, takeoff, level flight, landing, etc),
Flight plan,
Position in time/space: time, longitude, latitude, altitude,
Aircraft type and specific properties, and
Qualifications of the pilot.

The context may be determined by the pilot, but also by the passage of time (and therefore the course of the flight) and by information from the aircraft (ARINC 429 data). One of the filters is, for example, the position and altitude of the aircraft. On the basis of position information, the available data can be filtered and displayed graphically, e.g. on a map. A map allows for all data to be framed geographically.

An additional aspect is the real-time aspect. Pilots notice during the different flight phases information relevant for other pilots, both from their own airline and from other airlines. Until now the only way to share information were the NOTAMs (Notices to Airman) or PIREPS (Pilot Reports) which pass through official (and often slow) channels and are therefore not suitable for supporting ad hoc reporting. A solution for this is a "social professional network" between pilots, within which the pilots, using the available interfaces (iPhone, iPad, Class 2, web portal) can rapidly share relevant information with each other. When the reporting of information is done via the method and selection criteria described herein, the work context may contribute to an accelerated distribution of the events and thus to increased safety. The result of these contributions will be "User Generated Content" or "Pilot Generated Content" (PGC), which can be provided by the system as additional information that hitherto was not available in combination with the existing information.

Examples of PGC are:
Annotations to the standard briefing data that could increase the relevance and thus the selection speed for the other pilots
Updates of contact details of the various partners in the airports,
Turbulence or other temporary weather phenomena,
Problems with the vehicle outside the legal obligations,
Operational remarks regarding handlers, traffic control, etc, and Local information for other crew members (about hotels, events, etc.).

The invention is developed in particular for the aviation sector. However, the invention is more widely applicable, and in particular in the entire transport sector. In this context, transport sector should be understood as sector in which transfers with a vehicle form an essential part of the activities. According to this definition, military operations, for example a mission carried out with a tank, are also included within the wording transport sector. Indeed, the invention will also be applicable to such activities, as the qualification of the user as well as the vehicle as well as the location and the time are factors which determine the relevance of information for carrying out such a task.

The invention claimed is:

1. A method for supplying transport activity related data to an interface of a predetermined user who is to perform a given task, wherein the method comprises the following steps:
   a) storing a plurality of transport activity related data in a database of a central information storage system, wherein the plurality of data comprises different data types which are periodically loaded from different sources and are updated at different updating frequencies;
   b) attributing at least four parameters to each of the data stored in said database, wherein:
      a first parameter contains one or more vehicle identifier means;
      a second parameter specifies at least one qualification, which qualification is user-related;
      a third parameter defines an area for which the data is relevant; and
      a fourth parameter defines a time period within which the data is considered valid;
   c) running a program partly at said interface, which is separate from the central information storage system and provided for communicating therewith via a communication link, the program comprising the steps of:
      c1) registering said predetermined user at said interface;
      c2) obtaining at least one qualification attributed to the registered user;
      c3) obtaining a vehicle identifier means related to a vehicle with which said user works for performing said task; and
      c4) determining at least one location and at least one moment in time wherein the interface is located and/or will be located upon performing said task;
   c5) creating on said central information storage system a selection of relevant data, relevant for the user and for the task to be performed, wherein data from the database are included in said selection of relevant data when each of the following criteria applies:
      said obtained vehicle identifier means is equal to one of said first parameter;
      at least one of said obtained qualifications is equal to one of said second parameter;
      at least one of said locations is located within said area of the third parameter; and
      at least one of said moments in time is located within said time period of the fourth parameter and
   c6) supplying only said selection of relevant data from said central information storage system to said interface.

2. Method according to claim 1, wherein further a set of functions is available in said interface, with which functions data can be modified by said interface, wherein the method comprises:
   attributing to each function at least one fifth parameter which specifies a role, which role is user-related;
   obtaining at least one role attributed to the identified user via said interface;
   making available only those functions to the identified user to which a role is attributed which is equal to a role attributed to the identified user.

3. Method according to claim 1, wherein said storing said plurality of transport activity related data in a database comprises the following steps:
   loading a first type of data via a communication link that extends between a first source and said database; and
   loading a second type of data via a communication link that extends between a second source and said database.

4. Method according to claim 3, wherein said loading a first type of data occurs periodically with a first frequency and said loading a second type of data occurs periodically with a second frequency which differs from the first frequency.

5. Method according to claim 1, wherein selecting data via said interface occurs periodically, wherein for each selection at least the location and the moment in time is updated.

6. Method according to claim 1, wherein a route plan is created that comprises at least a set of moments in time coupled to respective locations, which outline a route geographically and in time, wherein in said step of selecting data those data are selected for which the moments in time with their respective location from the latter set are located within the time period of the fourth parameter and the area of the third parameter.

7. Method according to claim 1, wherein a travel area is created that comprises at least one set of locations where the interface will be located in a predetermined travel period, wherein in said step of selecting data, those data are selected for which the travel area overlaps at least partially with the area of the third parameter, and for which the travel period overlaps at least partly with the area of the fourth parameter.

8. Method according to claim 1, wherein said selected data are displayed to the user via the interface.

9. Method according to claim 1, wherein the steps c2) and c3) comprise the entry of the qualification and the vehicle identifier means by means of recording means which are provided on the interface.

10. Method according to claim 1, wherein steps c2) and c3) comprise the lookup of the qualification and the vehicle identifier means on the basis of registration information which the user enters upon registering in step c).

11. Method according to claim 1, wherein the step c4) comprises entering the at least one location and the at least one moment in time by means of recording means which are provided on the interface.

12. Method according to claim 1, wherein the step c4) comprises looking up the at least one location and the at least one moment in time on the basis of registration information which the user enters upon registering in step c1).

13. Method according to claim 1, wherein said criteria have an adjustable level of importance, wherein optionally the criteria for which a lower level of importance is set, are ignored when selecting the relevant data.

14. Method according to claim 1, wherein transport activity related data selected by the interface are displayed to the user and wherein messages and/or annotations on the displayed data entered by the user are exchanged with interfaces of other users.

15. Method according to claim 14, wherein messages or annotations entered by the user are processed when selecting relevant data for supply to the interfaces of other users.

16. System for supplying transport activity related data to an interface of a predetermined user who is to perform a given task, the system comprising:
- a central information storage system, separate from said interface and provided for communicating therewith via a communication link, and comprising
- a database and first means for storing a plurality of transport activity related data in the database by periodically loading different data types from different sources and updating said data at different frequencies, and second means for attributing at least four parameters to each of the data in said data base, including:
  - a first parameter containing one or more vehicle identifier means;
  - a second parameter specifying at least one qualification, which qualification is user-related;
  - a third parameter defining an area for which the data is relevant; and
  - a fourth parameter defining a time period within which the data is considered valid;
- a program provided to be run partly at said interface, comprising:
  - a registration procedure for the registration of said predetermined user at said interface;
  - a qualification procedure for obtaining at least one qualification attributed to the registered user;
  - a vehicle identification procedure for obtaining a vehicle identifier means related to a vehicle with which said user works for performing said task; and
- a time and location procedure for determining at least one location and at least one moment in time wherein the interface is located and/or will be located upon performing said task, and
- a selection procedure for creating on said central information storage system a selection of relevant data, relevant for the user and for the task to be performed, wherein data from the database are included in said selection of relevant data when each of the following criteria applies:
  - said obtained vehicle identifier means is equal to one of said first parameter;
  - at least one of said obtained qualifications is equal to one of said second parameter;
  - at least one of said particular locations is located within said area of the third parameter; and
  - at least one of said particular moments in time is located within said time period of the fourth parameter, and
- a data supply procedure for supplying only said selection of relevant data from said central information storage system to said interface.

17. System according to claim 16, further comprising said interface wherein said interface includes an internal memory for storing said selection of relevant data.

18. System according to claim 16, wherein said interface includes a clock to determine said moment in time.

19. A system according to claim 16, wherein said interface includes position detection means in order to determine said location.

20. System according claim 16, wherein the interface has an application for displaying transport activity related data to the user, and wherein the system is provided to exchange messages or annotations on the displayed data, entered by the user, with interfaces of other users.

21. System according to claim 20, wherein the system is provided to process messages and/or annotations entered by the user in selecting relevant data for supply to the interfaces of other users.

* * * * *